US007198741B2

(12) United States Patent
Guzmann et al.

(10) Patent No.: US 7,198,741 B2
(45) Date of Patent: Apr. 3, 2007

(54) METHOD AND APPARATUS FOR MANUFACTURING MULTI-LAYER PRESS MOLDED BODIES

(75) Inventors: Marcus Guzmann, Leimen (DE); Mike Kosub, Bruchsal (DE); Andrea Aeckerle-Mueller, Weisenheim (DE)

(73) Assignee: Reckitt Benckiser N.V., NZ Hoofddorp (NL)

( * ) Notice: Subject to any disclaimer, the term of this patent is extended or adjusted under 35 U.S.C. 154(b) by 151 days.

(21) Appl. No.: 10/380,383

(22) PCT Filed: Sep. 18, 2001

(86) PCT No.: PCT/GB01/04137

§ 371 (c)(1),
(2), (4) Date: Aug. 20, 2003

(87) PCT Pub. No.: WO02/24440

PCT Pub. Date: Mar. 28, 2002

(65) Prior Publication Data

US 2005/0035479 A1 Feb. 17, 2005

(30) Foreign Application Priority Data

Sep. 20, 2000 (GB) ................................ 0023055.7

(51) Int. Cl.
*B29C 43/06* (2006.01)
*B29C 43/20* (2006.01)

(52) U.S. Cl. ....................... 264/113; 264/112; 264/123; 425/363

(58) Field of Classification Search ......... 264/109–128
See application file for complete search history.

(56) References Cited

U.S. PATENT DOCUMENTS 2,977,631 A 4/1961 Komarek et al.

(Continued)

FOREIGN PATENT DOCUMENTS

DE 1230523 A 1/1962

(Continued)

OTHER PUBLICATIONS

International Preliminary Examination Report dated Dec. 9, 2002 for application PCT/GB01/04137.
International Search Report dated Dec. 6, 2001 for application PCT/GB01/04137.

(Continued)

*Primary Examiner*—Mary Lynn Theisen
(74) *Attorney, Agent, or Firm*—Norris McLaughlin & Marcus PA

(57) ABSTRACT

A method for manufacturing press molded bodies having at least two separate layers of material is disclosed. The method comprises providing a pair of cooperating parallel arranged rollers (1, 2) defining a nip (3) therebetween and having cavities defined on their outer surfaces, each cavity on one of the rollers (1, 2) cooperating with another cavity of the other roller (2, 1) to form die means, the axes (4, 5) of the rollers (1, 2) being arranged substantially horizontally, feeding at least two contiguous separate streams of different particulate materials into die means adjacent to the nip (3), so that each die means will be filled with portions of different material and counter-rotating the rollers (1, 2) so that the materials contained in the die means will be compressed into press molded bodies (briquettes) having at least two separate layers of material. An apparatus for the manufacture of press moulded bodies is also disclosed.

22 Claims, 1 Drawing Sheet

U.S. PATENT DOCUMENTS

| | | | | |
|---|---|---|---|---|
| 3,269,611 | A | 8/1966 | Komarek | |
| 4,389,178 | A | 6/1983 | Komarek | |
| 5,271,319 | A | 12/1993 | Plagemann | |
| 5,630,202 | A | 5/1997 | Bergendahl | |
| 5,935,496 | A * | 8/1999 | Waatti | 264/113 |
| 6,120,802 | A * | 9/2000 | Breitenbach et al. | 424/464 |

FOREIGN PATENT DOCUMENTS

| | | | |
|---|---|---|---|
| DE | 2258580 | A | 6/1974 |
| DE | 3806398 | A1 | 9/1989 |
| EP | 0923875 | A1 | 6/1999 |
| GB | 2332387 | A | 6/1999 |

OTHER PUBLICATIONS

Combined Search and Examination Report dated Mar. 26, 2001 for application GB 0023055.7.

Written Opinion for application PCT/GB01/04137.

Patent Abstracts of Japan; vol. 007, No. 250 (M-254), Nov. 8, 1983 & JP 58 135800 A (Shintou Baauindo KK), Aug. 12, 1983; abstract.

English-language abstract for DE 3806398.

Two pages of a trade brochure entitled "Form Press Systems" from Hosokawa Bepex GmbH.

* cited by examiner

METHOD AND APPARATUS FOR MANUFACTURING MULTI-LAYER PRESS MOLDED BODIES

The present invention relates to a method and an apparatus for manufacturing press molded bodies having at least two separate layers of material.

Manufacturing of briquettes (press-formed bodies of agglomerated particulate material) using roller compaction (briquetting) is a well-known manufacturing process, and briquetting presses for compacting particulate material in complementary cavities disposed about the peripheries of a pair of cooperating rollers have been in use for many years. The rollers are disposed horizontally and are rotated in opposite directions about vertically spaced axes, so that the peripheries of the rollers are disposed in substantial rolling contact with each other. Powder is then fed above the zone where the rollers come into closer contact, the powder being compacted in the nip defined by the facing cavities of the rollers.

Different systems for feeding particulate material into the nip of the rollers have been proposed. The simplest feeding system is a gravity hopper where powder is allowed to fall by gravity onto the required zone between the rollers. This method is simple but will only work adequately if the fed powder has a sufficiently high density and flowability. In case of lighter or less flowable powder it is necessary to effect a pre-compression of the powder being fed to deliver the same uniformly under constant pressure to the briquetting rollers to ensure the formation of consistent high quality briquettes.

To effect the pre-compression of particulate material or powder, feed screws have been proposed (U.S. Pat. No. 2,977,631 and U.S. Pat. No. 3,269,611). Alternatively, an axially reciprocating shaft disposed within a feeding funnel has been proposed (U.S. Pat. No. 4,389,178).

However, known briquetting machines are not well adapted for the manufacturing of briquettes or tablets made of two or more compositions, which remain physically separated in the briquette, i.e. in the form of separate layers.

Shaped bodies having separate layers of material have been manufactured in the past, an example of a solution for manufacturing two-layer shaped bodies being described in GB 2 332 387. Two independent feeding systems are provided for dosing the compositions into cavities of the rollers remotely from the nip of the machine. This process is only applicable to solidifiable liquid compositions or more generally to compositions that will cling to the cavities where they have been deposited when the cavities are moved into a vertical position shortly before forming the compaction nip. Thus, this solution cannot be used for briquetting free-flowing granular material.

Another solution for manufacturing press-shaped bodies is described in DE 1 230 523. In this specification, a rotary press machine is used for manufacturing tablets comprising different compositions incompatible with each other.

The object of the present invention is to provide an improved method and apparatus for manufacturing in an easy and cost effective way press molded bodies having at least two separate layers of material, starting from free-flowing granular or particulate material.

Accordingly, the present invention provides a method for manufacturing press molded bodies having at least two separate layers of material, comprising providing a pair of cooperating parallel arranged rollers defining a nip therebetween and having cavities defined on their outer surfaces, each cavity on one of the rollers cooperating with another cavity of the other roller to form die means, the axes of the rollers being arranged substantially horizontally, feeding at least two contiguous separate streams of different particulate materials into die means adjacent to the nip so that each die means will be filled with portions of different material, counter-rotating the rollers so that the material contained in the die means will be compressed into press molded bodies ("briquettes") having at least two separate layers of material.

Preferably, the particulate material is fed substantially vertically from above.

At least one of the separate streams can be fed by gravity.

At least one of the separate streams may be fed by a feeding device, for example a feeding screw.

It is preferred that a compact overall stream of particulate material having a total cross sectional area is fed, each separate stream forming part of the total cross sectional area.

Two separate streams having rectangular cross section may be fed.

Two separate streams can be separated from each other along a substantially vertical dividing plane parallel to the axes of the rollers.

By use of the term substantially horizontally we prefer that the rollers are within 10° of the horizontal.

At least one of the separate streams of material can be pre-compressed before entering the die means.

Preferably, the separate streams have different colours and/or different compositions and/or different granulometries.

In a further aspect, the invention provides an apparatus for manufacturing press molded bodies having at least two separate layers of material, in particular to be used in the method according to the invention, comprising a pair of cooperating parallel arranged rollers defining a nip therebetween and having cavities defined on their outer surfaces, each cavity on one of the rollers cooperating with another cavity of the other roller to form die means, the axes of the rollers being arranged substantially horizontally, drive means for counter-rotating the rollers, feeding means for feeding at least two contiguous separate streams of different particulate materials into die means adjacent to the nip so as to fill each die means with portions of different material, so that the material contained in the die means will be compressed into press molded bodies ("briquettes") having at least two separate layers of material.

Preferably, the feeding means comprises a feeding hopper, the feeding hopper being divided along at least one substantially vertical plane that is parallel to the axes of the rollers.

Conveniently, the feeding hopper is divided by a substantially vertical blade of sheet material. By substantially vertical we mean that the blade is placed within 10° of vertical.

Preferably, the substantially vertical blade extends through all the height of the hopper.

Conveniently, the vertical position of the blade is adjustable.

Conveniently, the feeding hopper is divided into two halves.

Preferably, a pre-compressing means is provided for pre-compressing at least one of the separate streams before the same enters the die means.

Conveniently, at least one feeding device is provided for feeding at least one of the separate streams. At least one feeding screw can be provided inside the feeding hopper. Preferably, the at least one feeding screw tapers toward an open discharge end of the hopper.

Preferably, the feeding hopper has an open discharge end extending inwardly between the nip.

Other objects and advantages of the invention will become apparent from the following description and accompanying drawings in which.

Figure 1:
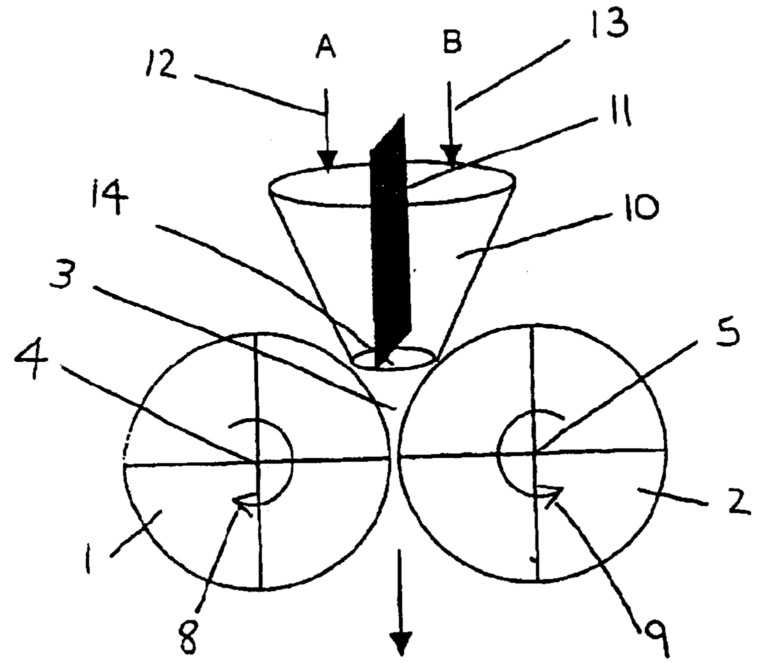
FIG. 1 is a schematic representation showing major components of a briquetting machine according to the invention in a side view.

Referring now to FIG. 1 of the drawings, an apparatus for manufacturing press molded bodies from particulate material is shown, for example for manufacturing detergents in the form of small tablets, comprising a pair of cooperating parallel arranged rollers 1, 2 defining a nip 3 therebetween and having cavities (not shown) on their outer surfaces. One cavity on one of the rollers cooperates with another cavity on the other roller, whereby a die means is formed. Cooperating cavities can (but do not need to) be of same size. Each roller has cavities disposed in axial and circumferential directions, respectively. The axes 4, 5 of the rollers 1, 2 are arranged substantially horizontally.

A drive means (not shown) is provided for rotating the rollers in opposite directions indicated by arrows 8, 9.

A feeding hopper 10 is arranged vertically above the nip 3. According to the invention, a division is made in the hopper with a substantially vertically extending blade 11 of sheet material, the blade extending along the entire vertical height of the hopper 10. The orientation of the blade 11 can depart slightly from the vertical direction, e.g. within a range of +/−20°. An elongated slot-like discharge opening at a bottom end 14 of hopper 10 extends substantially over the axial length of the rollers in order to fill a plurality of axially adjacent cavities simultaneously.

By provision of the division in the hopper, substantially vertically extending flow channels are created through which two different granular materials ("A" and "B") can be fed separately to the hopper as indicated by arrows 12, 13, and these two materials will flow by gravity towards the nip 3 in a substantially vertical flow. In the embodiment shown in FIG. 1, the vertical division of the hopper, for example a piece of sheet metal, is shown to be oriented in a vertical plane, parallel to the axes 4, 5 of the rollers.

Figure 2:
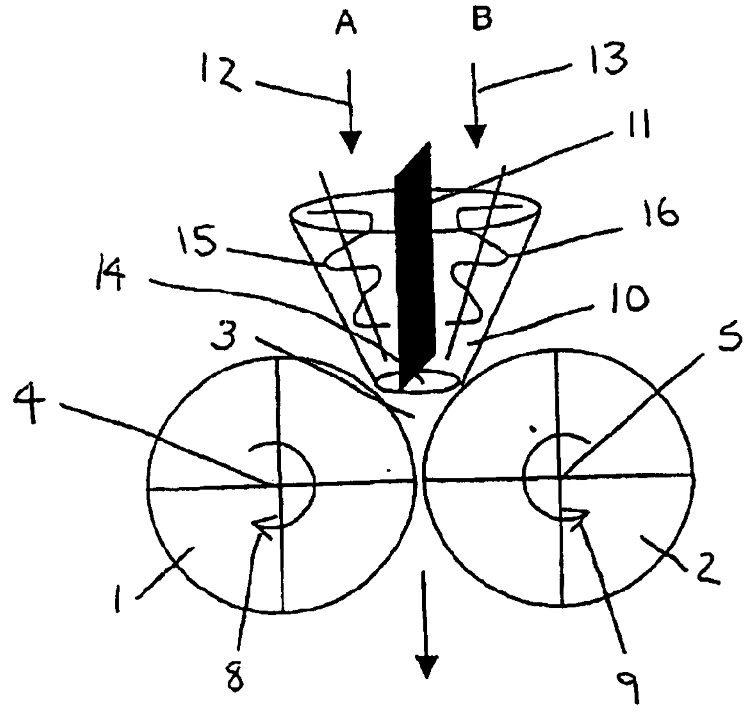
FIG. 2 is a representation similar to FIG. 1, showing an alternative feeding means.

FIG. 2 shows a modification of the apparatus according to FIG. 1, wherein feeding screws 15, 16 are provided in the two halves of the hopper 10. Depending on the flowability of the particulate material to be fed, the feeding screws act simultaneously as a pre-compressing means increasing the density of the material.

The claims which follow are to be considered an integral part of the present disclosure. Reference numbers (directed to the drawings) shown in the claims serve to facilitate the correlation of the integers of the claims with illustrated features of the preferred embodiment(s) but are not intended to restrict in any way the language of the claims to what is shown in the drawings, unless the contrary is clearly apparent from the context.

The invention claimed is:

1. A method for manufacturing press molded bodies having at least two separate layers of material, comprising the steps of:

providing a pair of cooperating parallel arranged rollers (1, 2) defining a nip (3) therebetween and having cavities defined on their outer surfaces, each cavity on one of the rollers (1, 2) cooperating with another cavity of the other roller (2, 1) to form die means, the axes (4, 5) of the rollers (1, 2) being arranged substantially horizontally, feeding at least two contiguous separate streams of different particulate materials into die means adjacent to the nip (3), so that each die means will be filled with portions of different material, counter-rotating the rollers (1, 2) so that the materials contained in the die means will be compressed into press molded bodies having at least two separate layers of material.

2. The method of claim 1, wherein the particulate material is fed substantially vertically from above.

3. The method of claim 1, wherein at least one of the separate streams is fed by gravity.

4. The method of claim 1, wherein at least one of the separate streams is fed by a feeding device (15, 16).

5. The method of claim 1 wherein a compact overall stream of particulate material having a total cross sectional area is fed, each separate stream forming part of the total cross sectional area.

6. The method of claim 5, wherein two separate streams having rectangular cross section are fed.

7. The method of claim 6, wherein the two streams are separated from each other along a substantially vertical dividing plane that is parallel to the axes (4, 5) of the rollers.

8. The method of claim 1, wherein at least one of the separate streams of material is pre-compressed before entering the die means.

9. The method of claim 1, wherein the separate streams have different colours and/or different compositions and/or different granulometries.

10. Apparatus for manufacturing press molded bodies having at least two separate layers of material, in particular using the method of claim 1, comprising a pair of cooperating parallel arranged rollers (1, 2) defining a nip (3) therebetween and having cavities defined on their outer surfaces, each cavity on one of the rollers (1, 2) cooperating with another cavity of the other roller (2, 1) to form die means, the axes (4, 5) of the rollers (1, 2) being arranged substantially horizontally, drive means for counter-rotating the rollers (1, 2), a feeding means (10, 15, 16) for feeding at least two contiguous separate streams of different particulate materials into die means adjacent to the nip (3) so as to fill each die means with portions of different material, so that the material contained in the die means will be compressed into press molded bodies having at least two separate layers of material.

11. The apparatus of claim 10, wherein the feeding means comprises a feeding hopper (10), the feeding hopper (10) being divided along at least one substantially vertical plane that is parallel to the axes (4, 5) of the rollers (1, 2).

12. The apparatus of claim 11, wherein the feeding hopper (10) is divided by a substantially vertical blade (11) of sheet material.

13. The apparatus of claims 12, wherein the substantially vertical blade (11) extends through all the height of the hopper (10).

14. The apparatus of claim 12, wherein the horizontal and/or vertical position of the blade is adjustable.

15. The apparatus of claim 12, wherein the feeding hopper (10) is divided into two halves.

16. The apparatus of claim 10, wherein an angle between the substantially vertical blade and the vertical direction is less than 20°.

17. The apparatus of claim 10, wherein a pre-compressing means is provided for pre-compressing at least one of the separate streams before the same enters the die means.

18. The apparatus of claim 10, wherein at least one feeding device (15, 16) is provided for feeding at least one of the separate streams.

19. The apparatus of claim 18, wherein at least one feeding screw (15, 16) is provided inside the feeding hopper (10).

20. The apparatus of claim 19, wherein the at least one feeding screw tapers toward an open discharge end (14) of the hopper (10).

21. The apparatus of claim 10, wherein the feeding hopper (10) has an open discharge end (14) extending inwardly between the nip (3).

22. The apparatus of claim 21, wherein the distance between the open discharge end (14) and the nip (3) is adjustable.

* * * * *